Aug. 7, 1962 A. J. WESOLOWSKI 3,048,725
ROTOR CONSTRUCTION
Filed April 29, 1958

INVENTOR:
ADOLPH J. WESOLOWSKI
BY David P. Ogden
HIS ATTORNEY

United States Patent Office 3,048,725
Patented Aug. 7, 1962

3,048,725
ROTOR CONSTRUCTION
Adolph J. Wesolowski, Erie, Pa., assignor to General
Electric Company, a corporation of New York
Filed Apr. 29, 1958, Ser. No. 731,655
7 Claims. (Cl. 310—271)

My invention relates to high temperature construction, and, more particularly, to banding wire on end turns of a high speed salient pole rotor and a method of brazing banding wire to a rotor.

In the past, it has been found necessary on rotating equipment to reinforce mechanically the ends of the rotor windings to prevent vibration or deflection by centrifugal forces during operation. Banding wire, secured by clips and solder to function as a solid band, has been used for this purpose. During recent attempts to increase the rating of a given size dynamoelectric machine to achieve more power while maintaining light weight, it has been expedient to increase the operating speed and to raise the machine's operating temperature to over 200° C. Sometimes high speed machines are expected to perform at temperatures as high as 300° C. or more. At these elevated temperatures, the strength of any solder maintaining the wire banding in a solid band is no longer of any value for containing the stresses created in the band by centrifugal force on the end turns of the rotor windings.

Because of the heat limitation of soldered banding wire, many special banding constructions have been devised during the past ten years. Also, considerable effort has been directed to designing machines which do not require any banding or which may use banding materials other than steel wire. Often such radical designs or materials are considerably more expensive or less versatile than wire banding.

Therefore, an object of my invention is to provide a new and improved brazed wire banding construction which will retain elements in position on rotating bodies subjected to high operating temperatures where previously known banding constructions are not reliable.

Another object of my invention is to provide a simple method of fabricating a support band for containing centrifugal forces of salient pole rotor windings.

According to one aspect of my invention, age hardened wire is tensioned around the end turns of the windings of an insulated and waterproof salient pole rotor. Brazing flux is applied at the ends of the wire. The wire is then brazed at a temperature below the age hardening temperature.

The subject matter which I regard as my invention is particularly pointed out and distinctly claimed in the concluding portion of this specification. My invention, however, as to its organization and method of operation together with further objects and advantages thereof, will best be understood by reference to the following description taken in connection with the accompanying drawing, in which:

Figure 1:
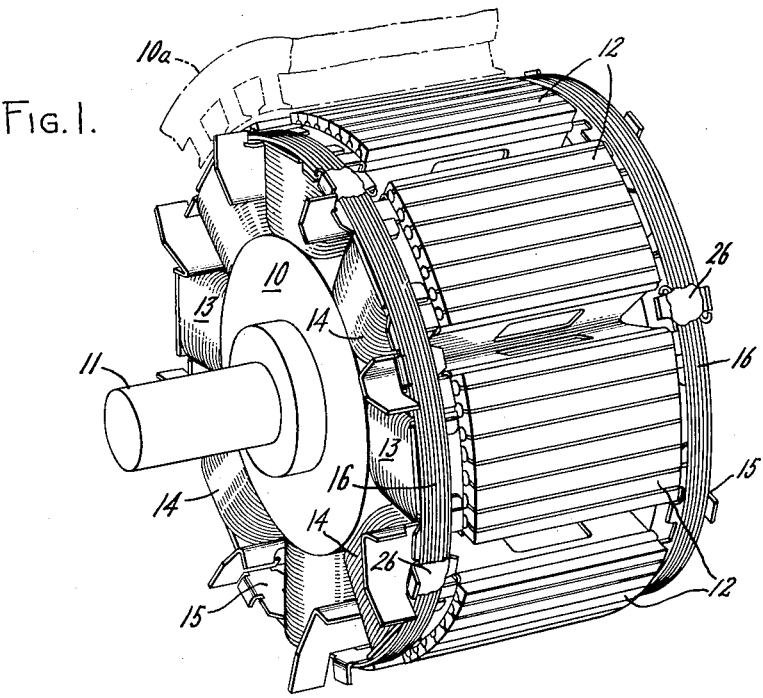
FIG. 1 is a perspective view of a salient pole machine provided with a wire banding constructed according to my invention.

Referring now to the drawing, in which like numerals refer to similar parts, I have shown in FIG. 1 a rotor 10 rotatably supportable on a shaft 11 and having a plurality of salient poles 12 each provided with a winding 13. The rotor 10 is a part of a dynamoelectric machine and, as is well understood by the electrical industry, will cooperate with a stator 10a (shown in phantom) to act as a transducer of electric energy into mechanical energy or vice versa.

The winding 13 extends axially from the region of the poles 12 and has end turns 14 at each end of the rotor 10 in a conventional manner. The sides of the windings are maintained in the slots or winding space between the poles 12 by slot wedges or top sticks 15. It is obvious that the winding extensions or end turns 14 will be affected by centrifugal force when an 8-inch diameter rotor 10 is rotated at high speeds such as 8000 or more revolutions per minute. Therefore, it has been found necessary to bind the end turns 14 to provide added support and thus prevent both undesirable displacement which would be likely to destroy electric insulation during high speed operation and undesirable static or dynamic imbalance which is likely to destroy the bearings of the machine.

According to prior art, a cold drawn steel banding wire was stressed as it is applied over the end turns 14 to maintain the end turns without radial displacement. However, since the cold drawn wire has its yield strength increased by cold working, it may not be heated to a brazing temperature without losing a large portion of its yield strength and without causing undesirable relief of any prestress because of both tempering and recrystallization of the metal. On the other hand, the use of even the high temperature solders, which are often considered similar to brazing, is unacceptable for another reason. Solder will soften and thus lose all useful strength at a temperature below the maximum operating temperature of the particular machine.

Since I have found that solder cannot be depended on to maintain binding bands in a machine operating in the neighborhood of 300° C., it is essential to use a higher temperature holding means. Not only does the solder soften to lose its strength, but also it is likely to melt at elevated temperatures and be thrown against conductors or into ventilation passages.

Because of these problems, many other types of special banding arrangements have been attempted during recent years. Often such a special rotor is only of value in a few very special dynamoelectric machines.

Once I considered brazing banding wire, I was confronted with the problem of finding a wire that could be brazed without the occurrence of prestress relaxation. Much to my surprise, wires of alloy steel which could be both prestressed and brazed have been available for several years. However, the particular alloys of these wires cannot be brazed by many of the ordinary brazing alloys because of their being non-wettable thereby.

According to my invention, I utilize an alloy steel banding wire such as 17–4 (17 percent chromium and 4 percent nickel) stainless steel having either 4 percent copper or 2.5 percent molybdenum. In the art of metallurgy, these and similar alloys will be recognized as ones which may be precipitation hardened or age hardened. After age hardening at an elevated temperature for an hour or more, wires of these alloys have a high tensile strength at slightly lower elevated temperatures.

Age hardening is basically a three-step process where a metal is first heated to a "solution" temperature of about 1000° C. to form a homogeneous austenitic structure. Then it is quenched to maintain the homogeneous alloy obtained at the solution temperature. After cooling, the alloy is aged at the precipitation hardening temperature of about 730° C. to cause a precipitation or regrouping of chromium carbides within the metal resulting in a very hard and tough martensitic matrix on cooling to room temperature. Depending on the particular alloy selected and the temperature and time of the aging process, the properties of the metal (or wire) may be controlled.

It is well known that if the precipitation is allowed to go to completion at the age hardening temperature, heating this particular steel alloy wire to less than this temperature will not materially affect the ultimate tensile strength or the yield strength of the banding wire 16. Also, it is known that this alloy has very high tensile and yield strength at elevated temperature less than the age hardening temperature. With the above discussion in mind, the value of this strength for securing by brazing a prestressed piece of this alloy becomes obvious.

It is an important feature of my invention that I utilize a brazing material which will flow at a temperature below age hardening temperature. In order to maintain maximum yield strength, it is requisite that the brazing operation does not cause the wire to go into an austenite solution. Accordingly, if one of the age hardened banding wires 16 having a solution temperature of 1000° C. and a precipitation temperature of approximately 700° C. is used, it is requisite that the brazing temperature does not exceed 900° C., and I prefer that it does not exceed 700° C. by any large amount, and then only for brief periods, to prevent possible overaging of the banding.

It should be noted that the alloys I have in mind have yield strength of approximately 200,000 p.s.i. at 100° C. and a short time yield strength of approximately 40,000 p.s.i. at about 600° C. With these properties in mind, I prefer to use a brazing material having a brazing temperature of less than 625° C. However, since many brazes will not adhere to stainless steels, I have found that two products of Handy & Harman marketed as Easy Flow No. 3 having a flow temperature of 690° C. and Easy Flow No. 45 having a flow temperature of 620° C. work satisfactorily on a banding wire having a tensile prestress of 35,000 p.s.i. or more.

It appears obvious that if the brazing temperature is above 600° C. and the prestress is above 40,000 p.s.i., the brazed wire band should have a prestress of less than 40,000 p.s.i. However, I have found an arrangement whereby the prestress after brazing may be substantially above the yield strength of the alloy during the brazing operation. The theory behind this is based on the fact that the heating of a finite length of the banding wire 16 will cause some thermal expansion of the band, coupled with the fact that the bound members or end turns 14 are substantially rigid and do not expand because of resiliency or heating in a manner to cause a corresponding tension in the thermally expanded band. Thus, the banding wire 16 tension will be relieved because of thermal elongation without sufficient elasticity in the bound member to cause appreciable stresses of the elongated banding wire 16.

Figure 2:
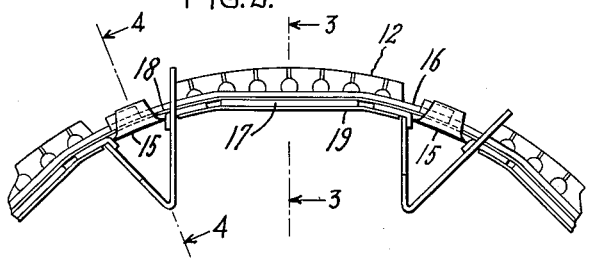
FIG. 2 is an end view of a section of the rotor shown in FIG. 1.
Figure 3:
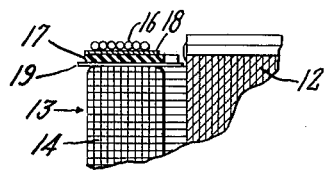
FIG. 3 is a cross-sectional view of the banding wire taken along the line 3—3 of FIG. 2.

In one particular application, this is accomplished by the use of impregnated glass insulation. A woven glass mat insulator 17 (FIGS. 2 and 3) is placed over the end turns 14 in contact with a thin metal strip 18. To provide rigid and cylindrical support of the banding wire 16 in actual operation, the insulator 17 is selected to provide an arcuate support of the strip 18 substantially equal to the periphery of the top stick 15. To provide suitable electrical properties in the rotor, another insulator 19 is placed under the insulator 17 and under the peripheral edges of the top stick 15. The glass mat insulators 17 and 19 have been found to have only a 0.6 percent compressibility when heated to 200° C. and subjected to 4,000 p.s.i. Since 4,000 p.s.i. is approximately twice the normal pressure expected during operation, and since the glass mat will inhibit heat conduction to the coils during brazing, it is obvious that these insulators 17 and 19 will allow the brazed thermal elongation (approximately .01 inch per braze) to substantially relax the banding wire 16. The insulation on the wire has similar mechanical properties.

Also, it should be noted that the thermal coefficient of expansion of this insulation is substantially equal to that of steel so that thermal expansion of the salient pole windings during operation will not materially affect the tension in the banding wire.

In order to prevent individual strands of the banding wire 16 from cutting the insulation 17 over the end turns 14 of the windings 13, when the wire 16 is applied under a tension such as 150 pounds per strand or when the machine is in operation to produce a centrifugal pressure such as 2,000 p.s.i., I prefer to place the steet of thin metal strip 18 such as 18–8 stainless steel under the banding wire 16. One particular strip 18 found satisfactory is approximately .02" thick and is wide enough (FIG. 3) to support all of the banding wire turns. I prefer to have the ends of the strip 18 overlap slightly to facilitate slippage thereof during the binding process.

Figure 4:
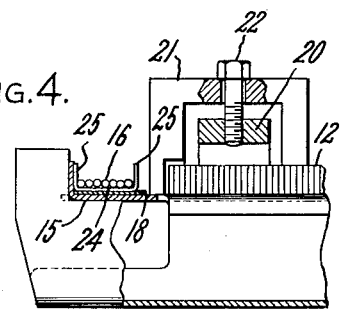
FIG. 4 is a cross-sectional view of the unbrazed wire banding taken along the line 4—4 of FIG. 2.

In order that the turns at the inner end of the band have approximately as much prestress as those at the outer end, I prefer to compress mechanically during the winding of the banding wire the top sticks 15 near the poles 12 and start winding from that side of the band. One means of such compression is shown in FIG. 4. An annular steel band 20 is provided with a plurality of bifurcated clamps 21 which may be clamped against the top sticks 15 by tightening the bolts 22. When the banding wire 16 is in place and brazed, the clamp 20–22 is removed and the top stick returns to its normal position to press against and prestress the banding wire 16.

Another method of equalizing the stress in the banding wires is to operate the machine at excessive speeds, heated if necessary, to cause a limited elongation of the banding wire 16.

Since, in the particular machine shown, the top sticks 15 are metal and thus electrically conductive and since the strips 18 are conductive, an amortisseur circuit composed of these parts may be provided by simply omitting any electric insulation therebetween. With the prestress of the wire and rotation of the rotor 10 to create centrifugal stresses, the tension in the banding wire 16 is sufficient to cause a good electric connection between the strip 18 and each of the top sticks 15. However, in some embodiments of my invention, it may be desirable to insure a permanent electric connection between the strip 18 and the top stick 15 by welding or brazing each connection therebetween. With the process of my invention, it is a simple matter to braze each of these connections to provide a predetermined resistance of the amortisseur circuit.

Referring now to FIG. 4, the banding wire 16 is shown as positioned in a guide 24. In order to accomplish this, one end of the wire is tensioned as it is wrapped or bound over the end turns 14, as is well known in the art. For instance, when the rotor 10 is mounted in a lathe, I prefer to hold one end of banding wire 16 in a fixture that rotates with the rotor 10. Another non-rotatable fixture guides the tensioned wire into the proper position over the guide 24 on the strip 18. These wires 16 are placed over the end turns 14 with approximately 50,000 p.s.i. prestress in each wire. With one particular size wire, this amounts to 150 pounds tension during the binding process.

Figure 5:
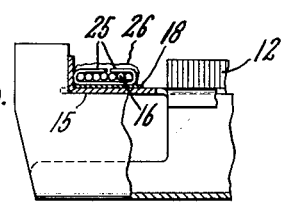
FIG. 5 shows a cross-sectional view of the brazed wire banding shown in FIG. 4.

When the proper number of turns, such as six, have been positioned, the lathe is stopped, a flux is applied, the ends 25 of the guide 24 are bent down as shown in FIG. 5 and a brazing material 26 having a melting temperature of less than the age hardening temperature of banding wire is applied. It should be noted that both 17–4 stainless steel alloys have a short time tensile strength of slightly over 40,000 p.s.i. at 655° C. Moreover, since the short time yield strength of these alloys of more than 40,000 p.s.i. and brazing thermally expands the wire, the tension of the binding operation will be maintained after brazing. The space under the ends 25 of the guide 24 (FIG. 3) is small enough to facilitate the flow of the brazing material by capillary action. Also, the use of a clip 24 having ears 25 facilitates heat distribution if a flame is used to braze the banding wire 16.

With this construction, I prefer to braze the strip 18 to both the top stick 15 and the guide 24 to eliminate any axial creepage of the banding wire 16 or the strip 18. In many applications, it may be desirable to use several guides and brazing connections (as shown in FIG. 1) for each band.

Obviously, if each of the wire strands is tensioned, the entire band will compress the end turns 14 and prevent radial displacement during operation up to the strength of the wire.

Figure 6:
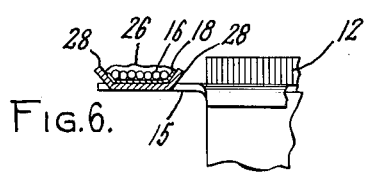
FIG. 6 shows a modification of the wire banding.

In FIG. 6, I have shown a modification wherein the guide 24 is replaced by raised ears 28 in the top stick 15. If several of the top sticks are provided with the ears 28, it will not be necessary to depend on a braze connection between the strip 18 and the top sticks 15 to maintain axial location of the strip 18 or the brazing wire 16.

I have found that most brazing fluxes used with low temperature brazes which adhere to stainless steels are corrosive to several materials used in the rotor construction. Therefore, in a machine including such insulation, it will be necessary to remove completely any flux residue. One of the simplest means of accomplishing this is to wash the rotor after the banding wire 16 is brazed in place. However, most suitable washing fluids, including water, are likely to damage ordinary rotor insulation prior to substantial completion of and waterproofing of the rotor in a usual manner such as dipping in a varnish and baking. Because of this, I prefer to dip and bake the rotor 10 to provide a waterproof construction prior to binding the end turns and particularly prior to brazing the banding wire 16 with a braze requiring a corrosive flux. Pre-dipping is necessary when using an insulation system that will not tolerate washing. If a washing fluid may be tolerated for a period of time, it is feasible to wet an unvarnished rotor and later to drive off any residual fluids by heating before applying any final varnish.

In summary, the process of my invention includes the steps of tensioning a precipitation or age hardened wire around the non-resilient cylindrical elements subject to radial expansion and securing the ends of the banding wire 16 by brazing with a brazing material having a flow point at a temperature substantially less (100° C. or more) than the solution temperature of the wire. If the flux is corrosive to the particular environment, it should be removed by washing. In many applications, the apparatus may need special preparation to allow it to be washed without damage. Care must be taken to provide a banding system wherein the bound members are rigid enough to prevent expansion with sufficient force to cause a stress in the thermally expanded wire exceeding yield strength of the wire during brazing. Also, in many applications, it will be necessary to provide support structure to prevent axial slippage of the band.

With this construction, using a conventional size wire and the usual number of turns, I have been able to increase the maximum speed of a particular rotor by at least 33 percent at 300° C. operating temperature. However, this maximum speed (12,000 revolutions per minute) is the limit of the test stand available and is not believed to be the maximum safe speed of the rotor tested.

While I have illustrated and described particular embodiments of my invention, other modifications will occur to those skilled in the art. For instance, this band construction is suitable for rotors of a different construction or for maintaining commutator segments or other elements subject to radial displacement. I intend, therefore, to cover in the appended claims all such modifications as fall within the true spirit and scope of my invention.

What I claim as new and desire to secure by Letters Patent of the United States is:

1. The method of making a reinforcing band for end turns of windings on a rotating member of a dynamo-electric machine subjected to operating temperatures on the order of 200° C. and above comprising the steps of applying an annular strip of metal about the end turns, tensioning a plurality of turns of a precipitation hardened steel wire about the strip and brazing the turns together with a brazing material having a flow point less than the solution temperature of the wire.

2. In a rotating body having elements thereon subject to displacement thereon by centrifugal forces, a reinforcing band for retaining the elements in position on the body comprising a plurality of turns of precipitation hardened steel wire tensioned about the elements, said turns being brazed together with a brazing material having a flow point less than the solution temperature of said wire.

3. In a rotating member of a dynamoelectric machine having salient poles extending radially from the axis of rotation of said member and having electrical coils about the poles, the end turns of the windings extending beyond at least one end of the poles; a reinforcing band about the end turns coaxial with the axis of the rotating member to retain the end turns upon rotation of the member at high speeds of rotation and high operating temperatures of the machine comprising an annular strip of metal overlying the end turns, a plurality of turns of precipitation hardened steel wire tensioned about said strip, the turns of said wire being brazed together, the brazing material having a flow point less than the solution temperature of the wire.

4. In a rotating member of a dynamoelectric machine having salient poles extending radially from the axis of rotation of said member and having electrical coils about the poles, the end turns of the windings extending beyond at least one end of the poles; a reinforcing band about the end turns coaxial with the axis of the rotating member to retain the end turns upon rotation of the member at high speeds of rotation and high operating temperatures of the machine comprising an annular metallic strip overlying the end turns, there being insulating material between said strip and the end turns, a plurality of turns of precipitation hardened steel wire tensioned about said strip and brazed together, the brazing material having a flow point less than the solution temperature of the wire.

5. In a salient pole rotor wherein windings about the poles have end turns extending beyond at least one end of the poles and top stick extending from between the salient poles between the end turns, a reinforcing band for retaining the end turns against centrifugal forces comprising an annular strip of metal overlying the end turns and the extending ends of the top stick, a plurality of turns of precipitation hardened steel wire tensioned about said strip, said turns secured together with a brazing material having a flow point less than the solution temperature of said wire, the strip being in electrical contact with the top sticks to provide an amortisseur circuit.

6. In a salient pole rotor wherein windings about the poles have end turns extending beyond at least one end of the poles and top sticks extending from between the salient poles between the end turns, a reinforcing band for retaining the end turns against centrifugal forces comprising an annular strip of metal overlying the end turns and the extending ends of the top stick, banding wire guides secured to said strip at the top stick extensions, a plurality of turns of precipitation hardened steel wire tensioned about said strip and in said guides, said wire being brazed together in said guides with a brazing material having a flow point less than the solution temperature of said wire.

7. A dynamoelectric machine subjected to operating temperatures of 300° C. and having a rotor operating at high peripheral speeds, said rotor having conductor end turns thereon, a reinforcing band for retaining said end turns in position on said rotor comprising a plurality of adjacent turns of precipitation hardened steel wound coaxial with the rotor axis tensioned about said end turns, said wire turns being brazed together with a brazing material having a flow point less than the solution temperature of said wire.

References Cited in the file of this patent

UNITED STATES PATENTS

| | | |
|---|---|---|
| 965,925 | McLeod | Aug. 2, 1910 |
| 2,427,417 | Prickett | Sept. 16, 1947 |
| 2,446,708 | Levin | Aug. 10, 1948 |
| 2,519,219 | Baudry et al. | Aug. 15, 1950 |
| 2,747,119 | Peterson et al. | May 22, 1956 |
| 2,899,573 | Wesolowski | Aug. 11, 1959 |